(12) United States Patent
Knott et al.

(10) Patent No.: US 8,722,834 B2
(45) Date of Patent: May 13, 2014

(54) EQUILIBRATION OF SILOXANES ON WATER-CONTAINING SULPHONATED CATION EXCHANGE RESINS

(75) Inventors: Wilfried Knott, Essen (DE); Frauke Henning, Essen (DE); Klaus-Dieter Klein, Mulheim an der Ruhr (DE); Horst Dudzik, Essen (DE)

(73) Assignee: Evonik Goldschmidt GmbH, Essen (DE)

( * ) Notice: Subject to any disclaimer, the term of this patent is extended or adjusted under 35 U.S.C. 154(b) by 0 days.

(21) Appl. No.: 13/119,822

(22) PCT Filed: Aug. 21, 2009

(86) PCT No.: PCT/EP2009/060818
§ 371 (c)(1),
(2), (4) Date: Mar. 18, 2011

(87) PCT Pub. No.: WO2010/031654
PCT Pub. Date: Mar. 25, 2010

(65) Prior Publication Data
US 2011/0172373 A1    Jul. 14, 2011

(30) Foreign Application Priority Data
Sep. 18, 2008    (DE) .......................... 10 2008 042 181

(51) Int. Cl.
*C08G 77/06*    (2006.01)
*C08G 77/08*    (2006.01)
*C08G 77/10*    (2006.01)

(52) U.S. Cl.
USPC ............................................ 528/23

(58) Field of Classification Search
USPC ............................................ 528/10
See application file for complete search history.

(56) References Cited

U.S. PATENT DOCUMENTS

| | | |
|---|---|---|
| 2004/0147703 A1* | 7/2004 | Burkhart et al. ................. 528/25 |
| 2006/0241270 A1* | 10/2006 | Burkhart et al. ................. 528/23 |
| 2006/0293481 A1* | 12/2006 | Seelye et al. ................... 528/32 |
| 2008/0293858 A1* | 11/2008 | Hergenrother et al. ........ 524/261 |

FOREIGN PATENT DOCUMENTS

WO    WO 2007/002344    1/2007

OTHER PUBLICATIONS

Text of First Office Action in Chinese Patent Application No. 200810177873.4 mailed Nov. 16, 2011.

* cited by examiner

*Primary Examiner* — Robert S Loewe
(74) *Attorney, Agent, or Firm* — Frommer Lawrence & Haug LLP

(57) ABSTRACT

The invention relates to a process for producing equilibration products of organosiloxanes by rearrangement of the siloxane bond to a cation exchange resin, the organopolysiloxanes thus obtainable, and the use thereof.

24 Claims, No Drawings

EQUILIBRATION OF SILOXANES ON WATER-CONTAINING SULPHONATED CATION EXCHANGE RESINS

The invention relates to a process for producing equilibration products of organosiloxanes by rearrangement of the siloxane bond to a water-containing cation exchange resin, the organopolysiloxanes thus obtainable, and the use thereof.

Equilibrations of siloxanes on ion exchange resins are part of the prior art. Among the multiplicity of known systems, the dried Amberlyst ion exchanger (in particular Amberlyst® 15) is a frequently used catalytic phase.

In particular, a process is presented for the equilibration of poly(methylhydrogen)-polydimethylsiloxane copolymers of the formula 1 on cation exchanger resins, wherein the cation exchange resins can have a water content of 8 to 20 percent by weight, and also the equilibration products thus produced of the poly(methylhydrogen)-polydimethylsiloxane copolymers.

Equilibration here is taken to mean the equilibrium-forming rearrangement of the siloxane bonds in equilibrated poly(methylhydrogen)-polydimethylsiloxane copolymers of the following structure.

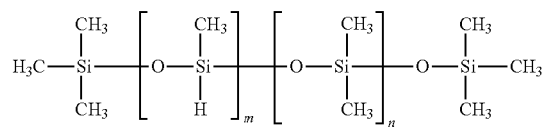

Formula (1)

Technically, the poly(methylhydrogen)-polydimethylsiloxane copolymers characterized by this structure are obtained by reorganization or equilibration of siloxane cyclics with longer-chain poly(methylhydrogen)siloxanes and hexamethyldisiloxane on acid catalysts. As acid catalysts, use is made of, for example, acid-activated bleaching earths (bentonites, montmorillonites, Fuller's earths, etc.) and sulphonated macrocrosslinked cation exchange resins.

DE 103 01 355 (U.S. 2004147703), which is hereby fully incorporated by reference with regard to the present invention, describes a process for producing equilibration products of organosiloxanes by rearrangement of the siloxane bond to a cation exchange resin in which an organosiloxane used as starting material or an organosiloxane mixture is brought into contact with a macrocrosslinked sulphonic acid-group-containing cation exchange resin at a temperature of 10° C. to 120° C. and the resultant equilibrated organosiloxanes are isolated, which is characterized in that use is made of a cation exchange resin the product P of specific surface area and median pore diameter of which is P≥2.2×10$^{-3}$ m³/kg and the specific surface area A of which is ≥35 m²/g. A dried cation exchange resin and/or a cation exchange resin having a (low) water content which is not made more specific is used.

EP 1 367 079 (U.S. 2003224925), in connection with the equilibration of polydimethylsiloxanes on sulphonated resins and subsequent reactivation thereof by treatment with low-molecular-weight siloxanes, indicates the importance of the water content on the sulphonated cation exchange resin and indicates that a water loading of <7, preferably 5, percent by mass must be set in order to obtain optimum polymerization conditions.

German Patent Application DE 10 2007 055484.4, which was not published at the priority date of the present application, is directed towards a process for the reorganization of polydimethylsiloxanes on sulphonated cation exchange resins which is characterized in that sulphonated cation exchange resins having water contents of 8 to 25 percent by weight are used. With the option of subjecting the nonfunctional silicone oils which are obtained in such a manner to a downstream thermal separation process, in the context of this technical teaching, obtaining chain length-defined polydimethylsiloxanes as stabilizer components in highly elastic polyurethane foams is described.

Compared with the abovementioned processes for equilibration of silicone oils, the equilibration of copolymeric dimethylsiloxane-poly(methyl)hydrogen-siloxanes, however, is much more demanding. A fundamental problem arises alone from the sensitivity of siloxanes having SiH groups to water in the presence of strong acids, from which potentially there results the risk of an SiH-loss by dehydrogenation with formation of SiOH functions with the possibility of further crosslinking of the siloxane backbone by condensation. However, industrial equilibration of siloxanes bearing SiH functions still requires the use of strongly acid catalysts in order that the chemical equilibrium is established in economically justifiable periods. With regard to the use of acid solid phase catalysts of the type of the sulphonated cation exchange resins, this also means that the water content may not be reduced so greatly that there is an inadequate protic activity on the catalyst. Acid-catalysed side reactions such as the above-described breakdown of SiH functions by dehydrogenation can lead to an unwanted chemical drying of the sulphonated resin and impair its usability as equilibration catalyst as far as complete deactivation. This observation is of great importance for the use of sulphonated resins as equilibration catalysts in the production of dimethylsiloxane-poly(methyl)hydrogensiloxanes, since process economics are not ensured until use of the sulphonated resin has been repeated many times. Premature deactivation of the solid phase connected with the necessity of catalyst replacement makes the use of such systems unattractive.

Dimethylsiloxane-poly(methyl)hydrogensiloxanes are, in particular, valuable starting materials in the synthesis of PU stabilizers and, here, in particular, for hot soft foam systems. The quality achieved of the equilibration resulting in these copolymeric hydrogen-siloxanes is mostly documented as soon as in the following step of an SiC-linking modification of the resultant equilibrated material with allyl polyethers and/or allyl polyether mixtures. If the molecular weight distribution and the microstructure of the resultant oligomers have not achieved the equilibrium state, hydrosilylation, i.e. the noble-metal-catalysed SiC linking reaction between SiH-group-containing siloxane and allyl polyether(s) always yield greatly turbid silicone polyether copolymers which, when used as PU foam stabilizer in soft foam systems, always leads to great foam decay up to foam collapse. The application test, i.e. the use of silicone polyether copolymers in polyurethane hot soft foam systems, which silicone polyether copolymers can be synthesized via equilibration and subsequent hydrosilylation, is extremely sensitive and is thereby a suitable method for assessing the quality of the contested synthesis pathway.

The technical problem which is to be solved accordingly now consists in finding a system which permits the equilibration of SiH-group-bearing siloxanes, in particular copolymeric dimethylsiloxane-poly(methyl)hydrogensiloxanes, in such a manner that the contradictory requirements of rapid equilibration kinetics, high catalyst stability and optimum product quality are achieved simultaneously.

Astonishingly, it has now been found that, in addition to the geometric parameters already specified in DE 103 01 355

(U.S. 2004147703) (specific surface area and median pore diameter), the water content of the sulphonated resin used is also critical not only for the equilibration kinetics, the catalyst stability, but also for the quality which is achieved of the resultant poly(methylhydrogen)-polydimethylsiloxane copolymers. In a departure from the advantageous water loading of <7, preferably 5, percent by mass found in the equilibration of nonfunctional polydimethylsiloxanes in EP 1 367 079 (U.S. 2003224925), a macrocrosslinked sulphonated cation exchange resin, in the equilibration of poly(methylhydrogen)-polydimethylsiloxane copolymers develops its optimum activity when the product P of specific surface area and median pore diameter of this is $P \geq 2.2 \times 10^{-3}$ m$^3$/kg and the specific surface area A thereof is $\geq 35$ m$^2$/g, and the water loading thereof is between <20 and >8%.

These findings could in no way have been predicted by those skilled in the art, since the low water burden of a sulphonated cation exchange resin in EPA 1 367 079 is a condition for the successful equilibration in nonfunctional silicone oils and, in addition, it is known how sensitively siloxanes having SiH groups can react with water in the presence of strong acids (SiH loss by dehydrogenation with formation of SiOH functions with the risk of further crosslinking by condensation).

The abovementioned problem is solved in one embodiment by a process for producing equilibration products of organosiloxanes by rearrangement of the siloxane bond to a water-containing sulphonated cation exchange resin, wherein an organosiloxane used as starting material or an organosiloxane mixture is brought into contact with a macrocrosslinked, water-containing and sulphonic-acid-group-containing cation exchange resin at a temperature of 10° C. to 120° C. and the resultant equilibrated organosiloxanes are isolated, characterized in that use is made of a water-containing cation exchange resin, the product P of the specific surface area thereof and the median pore diameter thereof of which is $P \geq 2.2 \times 10^{-3}$ m$^3$/kg and the specific surface area A is $\geq 35$ m$^2$/g and in addition has a water content of between 8 and 25 per cent by weight (based on the mass of the cation exchanger used).

Surprisingly, it has been found that, for example, water-containing Lewatit® K 2621, as sulphonated ion exchange resin, enables the equilibration equilibrium to be established in an adequately rapid manner with respect to time and that the hydrogensiloxanes thus obtained form clear liquids which are preferably starting materials for producing soft polyurethane foam stabilizers.

These findings are surprising to those skilled in the art, since this polymeric resin, as macroporous sulphonated polystyrene, has an identical basic chemical structure to Amberlyst® 15, and, furthermore, also demonstrates similar macroscopic properties, as shown in Table I:

TABLE I

| Ion exchange resin | Surface area [m$^2$/g] | Median pore diameter [nm] |
|---|---|---|
| Amberlyst ® 15 | 45 | 25 |
| Lewatit ® K 2621 | 40 | 65 |

In addition, it was unexpected that the water content of the cation exchange resin would be able to affect the equilibrium reaction favourably.

In a preferred embodiment, the process is characterized in that low-molecular-weight organopolysiloxanes, in particular linear organopolysiloxanes, are depolymerized and equilibrated. In particular, an organosiloxane is isolated which is in equilibrium of the chemical compounds. In particular, as starting material, use is made of an organosiloxane the viscosity of which is up to about 10 000 cP.

Preferably, use is made of siloxanes and H-siloxanes which have 3 to 200 Si atoms.

In a further embodiment, use is made of a water-containing cation exchange resin the median pore diameter of which is at least about 65 nm and the average specific surface area of which is about 30 to 50 m$^2$/g.

The water content of the cation exchange resin is preferably 8 to 20 percent by weight, in particular 8 to 15 percent by weight.

The rearrangement is preferably carried out at a temperature of about 35° C. to about 100° C.

According to the invention, the process is carried out, in a further embodiment, continuously; a fraction having the desired boiling range is separated off from the outflowing organosiloxane mixture, the fraction having the unwanted boiling range is recirculated into the feed of organosiloxanes.

In particular, use is made of a mixture of hexamethyldisiloxane, poly(methyl)hydrogensiloxane and siloxane cyclics as starting material.

A further embodiment is the use of organosiloxanes for linking SiC bonds, wherein a mixture of these organosiloxanes and allyl polyethers is brought into contact with a platinum metal complex and the polysiloxane which is obtained is used as soft polyurethane foam stabilizer.

Using the present invention it is possible to produce organohydrogensiloxanes made up statistically uniformly, having a defined equilibrium of linear and cyclic compounds by equilibration of a mixture of methylhydrogenpolysiloxane and cyclic or linear, if appropriate hydrogen-functionalized, polysiloxanes using a defined macrocrosslinked sulphonic-acid-group-containing cation exchange resin. DE-A-21 52 270 is hereby explicitly incorporated by reference with regard to these and further definitions.

It is necessary to ascertain that all soft foam stabilizers (polyethersiloxanes) which have been produced on the basis of Amberlyst® 15, Purolite® CT 169 D (surface area 35 to 50 m$^2$/g, median pore diameter 24.0 to 42.5 nm) or Purolite® CT 165 (surface area 2.5 m$^2$/g, median pore diameter >100) as ion exchange system, are generally turbid liquids which lead to the collapse of the PU foam. Essential parameters for describing the catalyst phases to be used according to the invention are therefore the specific surface area and porosity, i.e. the median pore diameter. If a product is formed from the two values, this has the character of an inverse density (volume: mass) and permits a clean differentiation of the functional ion exchangers from ion exchangers which are not according to the invention.

For the ion exchanger Lewatit® K 2621 used by way of example, the consideration is as follows:

40 m$^2$/g×65 nm=2600 m$^2$ nm/g=$2.6 \times 10^{-3}$ m$^3$/kg.

The preferably sulphonated cation exchange resin used according to the invention having water contents between 8 and 20% by weight can be produced proceeding from cation exchange resins having relatively high water contents by physical and/or chemical drying. Physical drying can proceed, for example, in a drying cabinet, preferably at temperatures of 40 to 100° C., wherein, to support the drying, it is also possible to employ reduced pressure or to apply an inert gas stream. The drying progress achieved can be observed and controlled during this process by regular water determination (for example by Karl-Fischer titration or by differential weighing). Alternatively, the sulphonated cation exchange resins used according to the invention can also be chemically dried by bringing them into contact with siloxanes of low molecular weight as described for example in EP 1 367 079.

Production of the sulphonated cation exchange resins used according to the invention having water contents of 8 to 20% by weight can optionally also proceed from cation exchange resins of reduced water content. For this, the cation exchange resin is brought into contact with water. In the simplest case it is sufficient to store the sulphonated resin in a conventional atmosphere for a defined time period so that its intrinsic hygroscopicity leads to an increased water loading.

If the sulphonated cation exchange resin which is defined with respect to its water content is used for equilibration of polydimethylsiloxanes, it can be advantageous to admix the reactant system with defined amounts of water, in particular to effectively counteract water depletion of the resin—and in this case in particular below the limit according to the invention of 8% by weight of water—caused by interactions with other components of the reactant system. The addition can proceed continuously or batchwise. The addition of water necessary if appropriate can be determined by determining the water contained in the reaction discharge or optionally by (regular) determination of the water content in the cation exchange resin.

As cation exchange resins, use can be made in principle of all sulphonated cation exchange resins. Suitable cation exchange resins are for example, those which are produced by sulphonation of phenol/aldehyde condensates or of cooligomers of aromatic vinyl compounds. Examples of aromatic vinyl compounds for producing the cooligomers are: styrene, vinyltoluene, vinylnaphthalene, vinylethylbenzene, methylstyrene, vinylchlorobenzene, vinylxylene and divinylbenzene. In particular, the cooligomers which are formed by reacting styrene with divinylbenzene are used as precursor for producing cation exchange resins having sulphonic acid groups. The resins can in principle be produced so as to be gel-like, macroporous or sponge-like. The properties of these resins, in particular specific surface area, porosity, stability, swelling and/or shrinkage and exchange capacity, can be varied by the production process. Preferably, no use is made of gel-like cation exchange resins, but rather of porous, preferably macroporous, sulphonated cation exchange resins.

In the process according to the invention, conventional macroporous sulphonated cation exchange resins can preferably be used in their acidic, what is termed the "H form". Among the suitable polymer phases of the styrene-divinylbenzene type which are commercially available, here, a cation exchange resin is preferred, the product P of specific surface area and median pore diameter of which is P≥2.2× $10^{-3}$ m$^3$/kg and the specific surface area A of which is ≥35 m$^2$/g. Preferably, use is made of a cation exchange resin the median specific surface area of which is in the range from 35 to 50 m$^2$/g. Particularly preferably, use is made of Lewatit® K 2621 (Bayer AG) as sulphonated cation exchange resin.

In addition to the use of fresh cation exchange resin as catalyst, however, a sulphonated resin already used according to the process according to the invention for the reorganization of polydimethylsiloxane compositions can also be used. Small residual amounts of reorganized material which can then adhere to the surface of the catalyst do not customarily interfere in this process.

Siloxane raw materials which can be used in the process according to the invention are all conventional straight-chain and/or cyclic siloxanes. Preferably, mixtures are reorganized, which mixtures possess low-molecular-weight linear dimethylsiloxanes together with cyclic siloxanes and hexamethyldisiloxane as chain terminator. The upper limit of the viscosity of the polydimethylsiloxanes used in this case should preferably be at most 500 mPas. The chain length of the siloxane used is preferably in the range from 2 to 200 Si atoms.

Siloxane raw materials which can be used are preferably mixtures comprising or consisting of hexamethyldisiloxane and/or octamethyltrisiloxane and siloxane cyclics, such as, for example, hexamethylcyclotrisiloxane ($D_3$), octamethylcyclotetrasiloxane ($D_4$) and/or decamethylcyclopentasiloxane ($D_5$). Preferably, use is made of technical mixtures containing, or preferably consisting of, hexamethyldisiloxane and also $D_4$ and $D_5$.

The equilibration is preferably carried out at a temperature of 10° C. to 110° C., preferably at a temperature of 25° C. to 100° C. The equilibration can optionally be carried out at reduced pressure, atmospheric pressure or superatmospheric pressure. Atmospheric pressure here is intended to be meant as, in supplement to the definition at the outset, the respectively prevailing air pressure of the ambient atmosphere. Preferably, the equilibration is carried out at a pressure of 950 mbar to 1100 mbar, particularly preferably at 1013 mbar.

It can be advantageous to carry out the equilibration in reaction times of 20 minutes to 7 hours, preferably of 30 minutes up to 5 hours.

Very particularly preferably, the equilibration is carried out at a temperature of 25° C. to 100° C., a pressure of approximately 1013±10 mbar and in a time period of 30 minutes up to 5 hours, the reaction preferably takes place at 70° C.

If desired, the equilibration can also be carried out in the presence of a solvent. Suitable solvents are all those solvents which, in the equilibration, are inert to cation exchange resin (catalyst), starting materials and products. Particularly preferably, however, the equilibration, is carried out in the absence of a solvent.

The amount of the cation exchange resin to be used based on the reaction mixture, which cation exchange resin contains water within the abovementioned limits, is preferably from 8 to 25% by weight, particularly preferably from 8 to 15% by weight.

The process according to the invention can be carried out batchwise or else continuously.

It can be advantageous to separate off a subquantity having a desired boiling range from the equilibrated material which is obtained as reaction mixture of the equilibration according to the invention. The remaining residue of the equilibrated material which does not have the desired boiling range can be used again as starting material (organosiloxanes) in the equilibration. Particularly preferably, in particular when the process is carried out continuously, a subquantity having a desired boiling range is separated off from the resultant polysiloxane mixture and the remainder which does not have the desired boiling range is reused as starting material (organosiloxanes) in the equilibrated material. This separation can proceed, for example, by a simple thermal separation (such as, for example, by simple distillation or by similar measures).

Further embodiments of the process according to the invention result from the claims.

The equilibration products according to the invention and use thereof are described by way of example hereinafter, without the invention being restricted to these exemplary embodiments. If hereinafter ranges, general formulae or classes of compounds are cited, these comprise not only the corresponding ranges or groups of compounds which are explicitly mentioned, but also all subranges and subgroups of compounds which can be obtained by taking out individual values (ranges) or compounds. If, in the context of the present invention, documents are cited, their contents are hereby fully incorporated by reference in the contents of the present invention.

With reference to the examples hereinafter, the advantage of the present invention will be demonstrated.

WORKING EXAMPLES

Preparation of the sulphonated ion exchange resins used in the example according to the invention and in the example not according to the invention Lewatit® K-2621 in the commercial form having a high water content was placed in open evaporation dishes for a time period of 8 or 18 hours in a drying cabinet heated to 60° C. and then transferred in the still warm state to inertized vessels with exclusion of moisture and stored. The water content, according to Karl-Fischer titration, was 25% for the resin dried for 8 hours and 12% for the resin dried for 18 hours.

Amberlyst® 15 was obtained directly in the commercial form containing 5% of water. A subquantity of this resin was stored under a conventional atmosphere for approximately 5 hours, so that owing to the intrinsic hygroscopicity, a water loading of 10% was established.

Example 1

Production of a Hydrogensiloxane (Example According to the Invention)

A mixture consisting of 223.0 g of decamethylcyclopentasiloxane ($D_5$), 20.2 g of poly(methyl)hydrogensiloxane PTF1 (SiH content: 15.75 val/kg) and 6.9 g of hexamethyldisiloxane HMDS (61.5 mol of $D_5$: 0.135 mol of PTF1: 0.865 mol of HMDS) was admixed with 3 m-% of the predried ion exchange resin Lewatit® K-2621 (12% water content) and equilibrated with constant stirring for 6 hours at 70° C. and, after the reaction mixture was cooled, the ion exchange resin is separated off by filtration. The content of active SiH was determined at 1.26 val/kg by gas volumetry (destruction of a weighed siloxane sample using a sodium butylate solution). The viscosity of the hydrogensiloxane was 86.4 mPas (25° C.)

$^{29}$Si-NMR spectroscopy assigned to the hydrogensiloxane obtained according to the invention a median structure which may be represented by the following formula:

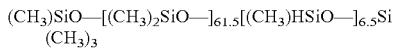

The sulphonated ion exchanger separated off by filtration was used analogously to the described procedure 6 further times for the equilibration of abovedescribed hydrogensiloxane, wherein the SiH contents of the equilibrated material were in the range between 1.26 and 1.27 val/kg, and the viscosities between 85.5 and 86.8 mPas. Accompanying $^{29}$Si-NMR spectroscopy confirmed the above cited structural formula.

The repeatability of the reaction confirms the reusability of the cation exchange resin.

Comparative Example 2

Production of a Hydrogensiloxane (Not According to the Invention)

A mixture consisting of 223.0 g of decamethylcyclopentasiloxane ($D_5$), 20.2 g of poly(methyl)hydrogensiloxane PTF1 (SiH content: 15.75 val/kg) and 6.9 g of hexamethyldisiloxane HMDS (61.5 mol of $D_5$: 0.135 mol of PTF1: 0.865 mol of HMDS) was admixed with 3 m-% of Amberlyst® 15 ion exchange resin (10% water content) and equilibrated with constant stirring for 6 hours at 70° C. and after the reaction mixture was cooled, the ion exchange resin was separated off by filtration. The content of active SiH was determined at 1.26 val/kg by gas volumetry. The viscosity of the hydrogensiloxane was 74.3 mPas (25° C.)

$^{29}$Si-NMR spectroscopy assigned the same median structure as in Example 1 to the hydrogensiloxane thus obtained. No significant differences from Example 1 are shown. Nevertheless, comparison of Examples 4 and 5 show that the behaviour is different:

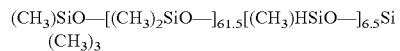

Comparative Example 3

Production of a Hydrogensiloxane (Not According to the Invention)

A mixture consisting of 223.0 g of decamethylcyclopentasiloxane ($D_5$), 20.2 g of poly(methyl)hydrogensiloxane PTF1 (SiH content: 15.75 val/kg) and 6.9 g of hexamethyldisiloxane HMDS (61.5 mol of $D_5$: 0.135 mol of PTF1: 0.865 mol of HMDS) was admixed with 3 m-% of a moderately predried ion exchange resin Lewatit® K-2621 (25% water content) and equilibrated with constant stirring for 6 hours at 70° C. and after the reaction mixture was cooled, the ion exchange resin was separated off by filtration. The content of active SiH was determined at 1.26 val/kg by gas volumetry. The viscosity of the hydrogensiloxane was 75.2 mPas (25° C.)

$^{29}$Si-NMR spectroscopy assigned to the hydrogensiloxane thus obtained the following median structure:

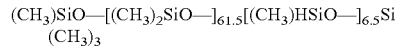

Example 4

(Further Processing of the Hydrogensiloxane Obtained in Example 1 to give Polysiloxane-Polyoxyalkylene Mixed Block Copolymers)

(1) 259.2 g (0.185 mol) of a polyether of the median formula $CH_2=CH-CH_2O-(C_2H_4O-)_5(C_3H_6O-)_{21}CH_3$, (2) 86.4 g (0.062 mol) of a polyether of the median formula $CH_2=CH-CH_2O-(C_2H_4O-)_{26}(C_3H_6O-)_4CH_3$, (3) 234.5 g (0.061 mol) of a polyether of the median formula $CH_2=CH-CH_2O-(C_2H_4O-)_{45}(C_3H_6O-)_{34}CH_3$, (4) 156.4 g (0.041 mol) of a polyether of the median formula $CH_2=CH-CH_2O-(C_2H_4O-)_{36}(C_3H_6O-)_{38}H$ and (5) 37.0 g (0.061 mol) of a polyether of the median formula $CH_2=CH-CH_2O-(C_2H_4O-)_{14}CH_3$ together with 15.4 mg of cis-$(NH_3)_2PtCl_2$, were charged into a flask provided with dropping funnel, stirrer, thermometer, gas inlet and reflux condenser. The apparatus was rendered inert by a gentle nitrogen stream. After the mixture was heated to 120° C., in each case 240 g (=0.301 mol of SiH) of the hydrogensiloxanes from Example 1 were added dropwise in the course of 30 minutes. The reaction mixtures were allowed to continue reacting for 3 hours and a quantitative SiH conversion was achieved (determined by gas volumetry by reaction with sodium butylate solution). After filtration through a Seitz-K-300 filter disc, clear, slightly yellowish products were obtained.

Example 5

(Further Processing of the Hydrogensiloxanes Obtained in Examples 2 and 3 to Give Polysiloxane-Polyoxyalkylene Mixed Block Copolymers)

Analogously to Example 4,
(1) 259.2 g (0.185 mol) of a polyether of the median formula $CH_2=CH-CH_2O-(C_2H_4O-)_5(C_3H_6O-)_{21}CH_3$,
(2) 86.4 g (0.062 mol) of a polyether of the median formula $CH_2=CH-CH_2O-(C_2H_4O-)_{26}(C_3H_6O-)_4CH_3$,
(3) 234.5 g (0.061 mol) of a polyether of the median formula $CH_2=CH-CH_2O-(C_2H_4O-)_{45}(C_3H_6O-)_{34}CH_3$,
(4) 156.4 g (0.041 mol) of a polyether of the median formula $CH_2=CH-CH_2O-(C_2H_4O-)_{36}(C_3H_6O-)_{38}H$ and
(5) 37.0 g (0.061 mol) of a polyether of the median formula $CH_2=CH-CH_2O-(C_2H_4O-)_{14}CH_3$
together with 15.4 mg of cis-$(NH_3)_2PtCl_2$ were charged into a flask provided with dropping funnel, stirrer, thermometer, gas inlet and reflux condenser. The apparatus was rendered inert by a gentle nitrogen stream. After the mixture was heated to 120° C., in each case 240 g (=0.301 mol of SiH) of the hydrogensiloxanes not according to the invention from Comparative Examples 2 and 3 were added dropwise in the course of 30 minutes. The reaction mixtures were allowed to continue reacting for 3 hours and a quantitative SiH conversion was achieved (determined by gas volumetry by reaction with sodium butylate solution). Despite the quantitative SiH conversion, the resultant polysiloxane-polyether copolymers were cloudy-opaque, slightly yellowish liquids which did not become clear even after filtration through a Seitz-K-300 filter disc.

Example 6

The performance characteristics of the foam stabilizers produced were tested using a foam formula in the following manner:

In each case 300 parts of a commercial polyether for producing flexible polyurethane foams, which polyether had three hydroxyl groups in the average molecule and a molecular weight of 3500, were mixed with 15 parts of water, 15 parts of a physical blowing agent, the corresponding amount of the foam stabilizer under test according to Example 1 according to the invention or to Comparative Example 2, 0.33 part of diethylenetriamine and 0.69 part of tin octoate were mixed with good stirring. After addition of 189 parts of toluene diisocyanate (mixture of 2,4 and 2,6 isomers in the ratio 4:1) the mixture was stirred for 7 seconds at 2500 rpm using a Glatt stirrer and poured into a box open at the top. This produced a fine-pored foam which was characterized by the following parameters:
1. Sag of the foam at the end of the rise phase (denoted by "sag" in Table II).
2. The number of cells per centimeter of foam which was determined microscopically.

Table II compares the measurements for 2 different concentrations (1.8 parts/1.5 parts) of the stabilizers obtained by the process according to the invention (Example 1/1-7) and also of the stabilizers not produced according to the invention (products of Comparative Examples 2 and 3).

TABLE II

| Example | Sag | Cells per centimetre |
|---|---|---|
| Example 1/1 | 0.7/1.4 | 15 |
| Example 1/2 | 0.8/1.5 | 14 |
| Example 1/3 | 0.7/1.4 | 15 |
| Example 1/4 | 0.7/1.5 | 14 |
| Example 1/5 | 0.8/1.4 | 14 |
| Example 1/6 | 0.7/1.4 | 15 |
| Example 1/7 | 0.7/1.4 | 15 |
| Comparative Example 2 | collapse | n.d. |
| Comparative Example 3 | collapse | n.d. |

Table II shows the reaction results after a total of 7 cycles of repeated equilibration using the same cation exchange resin. It confirms the reusability and repeatability of the reaction without it needing a "reactivation" or aftertreatment of the cation exchange resin.

The invention claimed is:

1. A process for producing equilibration products of organopolysiloxanes by rearrangement of the siloxane bond, comprising:
   utilizing a macrocrosslinked sulphonic-acid-group-containing cation exchange resin in a process for the reorganization of polydimethylsiloxanes;
   recovering said macrocrosslinked sulphonic-acid-group-containing cation exchange resin by filtration alone;
   bringing an organopolysiloxane utilized as starting material or an organopolysiloxane mixture, into contact with the recovered macrocrosslinked sulphonic-acid-group-containing cation exchange resin, at a temperature of 10° C. to 120° C., without performing any aftertreatment with an organic solvent or a mineral acid on the recovered macrocrosslinked sulphonic-acid-group-containing cation exchange resin after it is recovered; and
   isolating the resultant equilibrated organopolysiloxanes;
   wherein said recovered macrocrosslinked sulphonic-acid-group-containing cation exchange resin has a P value $\geq 2.2 \times 10^{-3}$ m$^3$/kg and an A value $\geq 35$ m$^2$/g, and is optionally utilized in the presence of a solvent;
   wherein P is the product of the specific surface area and the mean pore diameter of said recovered macrocrosslinked sulphonic-acid-group-containing resin;
   wherein A is the specific surface area of said recovered macrocrosslinked sulphonic-acid-group-containing resin; and
   wherein the water content of the recovered macrocrosslinked sulphonic-acid-group-containing resin is between 8 and 25 percent by weight based on the mass of the recovered macrocrosslinked sulphonic-acid-group-containing resin.

2. The process according to claim 1;
   wherein low-molecular-weight organopolysiloxanes are depolymerized.

3. The process according to claim 2;
   wherein low-molecular-weight organopolysiloxanes are equilibrated;
   wherein said recovered macrocrosslinked sulphonic-acid-group-containing cation exchange resin is utilized in the presence of the solvent;
   wherein the solvent is an aliphatic hydrocarbon;
   wherein an organopolysiloxane which is in equilibrium of the chemical compounds is isolated;
   wherein the median pore diameter of the cation exchange resin is at least about 65 nm;
   wherein the rearrangement is carried out at a temperature of about 35 to about 80° C.;

wherein the starting material is organopolysiloxanes with a viscosity of up to about 10 000 cP;
wherein the cation exchange resin has an average specific surface area which is about 30 to 50 m²/g;
wherein a fraction having the desired boiling range is separated off from the resultant organopolysiloxane mixture, and the fraction having the unwanted boiling range is recirculated into the feed of organopolysiloxanes; and
wherein the starting material is a mixture of hexamethyldisiloxane, poly(methyl)hydrogensiloxane, and siloxane cyclics.

4. The process according to claim 1;
wherein low-molecular-weight organopolysiloxanes are equilibrated.

5. The process according to claim 1;
wherein said recovered macrocrosslinked sulphonic-acid-group-containing cation exchange resin is utilized in the presence of the solvent; and
wherein the solvent is an aliphatic hydrocarbon.

6. The process according to claim 1;
wherein an organopolysiloxane which is in equilibrium of the chemical compounds is isolated.

7. The process according to claim 1;
wherein a cation exchange resin is utilized, the median pore diameter of which is at least about 65 nm.

8. The process according to claim 1;
wherein the rearrangement is carried out at a temperature of about 35 to about 80° C.

9. The process according to claim 1;
wherein, as starting material, organopolysiloxanes are utilized, the viscosity of which is up to about 10 000 cP.

10. The process according to claim 1;
wherein a cation exchange resin is utilized, the average specific surface area of which is about 30 to 50 m²/g.

11. The process according to claim 1;
wherein a fraction having the desired boiling range is separated off from the resultant organopolysiloxane mixture, and the fraction having the unwanted boiling range is recirculated into the feed of organopolysiloxanes.

12. The process according to claim 1;
wherein a mixture of hexamethyldisiloxane, poly(methyl) hydrogensiloxane, and siloxane cyclics is utilized as starting material.

13. A process for producing equilibration products of organopolysiloxanes by rearrangement of the siloxane bond, comprising:
utilizing a macrocrosslinked sulphonic-acid-group-containing cation exchange resin in a process for the reorganization of polydimethylsiloxanes;
recovering said macrocrosslinked sulphonic-acid-group-containing cation exchange resin by filtration alone;
bringing an organopolysiloxane utilized as starting material or an organopolysiloxane mixture, into contact with the recovered macrocrosslinked sulphonic-acid-group-containing cation exchange resin, at a temperature of 10° C. to 120° C., without performing any aftertreatment, except with water, on the recovered macrocrosslinked sulphonic-acid-group-containing cation exchange resin after it is recovered; and
isolating the resultant equilibrated organopolysiloxanes;
wherein said recovered macrocrosslinked sulphonic-acid-group-containing cation exchange resin is utilized, optionally in the presence of a solvent, which has a P value $\geq 2.2 \times 10^{-3}$ m³/kg and an A value $\geq 35$ m²/g;
wherein P is the product of the specific surface area and the mean pore diameter of said recovered macrocrosslinked sulphonic-acid-group-containing resin;
wherein A is the specific surface area of said recovered macrocrosslinked sulphonic-acid-group-containing resin; and
wherein the water content of the recovered macrocrosslinked sulphonic-acid-group-containing resin is between 8 and 25 percent by weight based on the mass of the recovered macrocrosslinked sulphonic-acid-group-containing resin.

14. The process according to claim 13;
wherein low-molecular-weight organopolysiloxanes are depolymerized.

15. The process according to claim 14;
wherein low-molecular-weight organopolysiloxanes are equilibrated;
wherein said recovered macrocrosslinked sulphonic-acid-group-containing cation exchange resin is utilized in the presence of the solvent;
wherein the solvent is an aliphatic hydrocarbon;
wherein an organopolysiloxane which is in equilibrium of the chemical compounds is isolated;
wherein the median pore diameter of the cation exchange resin is at least about 65 nm;
wherein the rearrangement is carried out at a temperature of about 35 to about 80° C.;
wherein the starting material is organopolysiloxanes with a viscosity of up to about 10 000 cP;
wherein the cation exchange resin has an average specific surface area which is about 30 to 50 m²/g;
wherein a fraction having the desired boiling range is separated off from the resultant organopolysiloxane mixture, and the fraction having the unwanted boiling range is recirculated into the feed of organopolysiloxanes; and
wherein the starting material is a mixture of hexamethyldisiloxane, poly(methyl)hydrogensiloxane, and siloxane cyclics.

16. The process according to claim 13;
wherein low-molecular-weight organopolysiloxanes are equilibrated.

17. The process according to claim 13;
wherein said recovered macrocrosslinked sulphonic-acid-group-containing cation exchange resin is utilized in the presence of the solvent; and
wherein the solvent is an aliphatic hydrocarbon.

18. The process according to claim 13;
wherein an organopolysiloxane which is in equilibrium of the chemical compounds is isolated.

19. The process according to claim 13;
wherein a cation exchange resin is utilized, the median pore diameter of which is at least about 65 nm.

20. The process according to claim 13;
wherein the rearrangement is carried out at a temperature of about 35 to about 80° C.

21. The process according to claim 13;
wherein, as starting material, organopolysiloxanes are utilized, the viscosity of which is up to about 10 000 cP.

22. The process according to claim 13;
wherein a cation exchange resin is utilized, the average specific surface area of which is about 30 to 50 m²/g.

23. The process according to claim 13;
wherein a fraction having the desired boiling range is separated off from the resultant organopolysiloxane mixture, and the fraction having the unwanted boiling range is recirculated into the feed of organopolysiloxanes.

24. The process according to claim 13;
wherein a mixture of hexamethyldisiloxane, poly(methyl) hydrogensiloxane, and siloxane cyclics is utilized as starting material.

* * * * *